(12) United States Patent
Besseling et al.

(10) Patent No.: US 7,028,544 B2
(45) Date of Patent: Apr. 18, 2006

(54) MASS FLOWMETER FOR MEASURING BY THE CT METHOD

(75) Inventors: Johannes Henricus Besseling, Ruurlo (NL); Joost Conrad Lötters, Gaanderen (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 10/834,104

(22) Filed: Apr. 29, 2004

(65) Prior Publication Data
US 2004/0226359 A1 Nov. 18, 2004

(30) Foreign Application Priority Data
May 13, 2003 (NL) .................................... 1023406

(51) Int. Cl.
*G01F 1/68* (2006.01)

(52) U.S. Cl. .................................. 73/202.5; 73/204.27

(58) Field of Classification Search ............... 73/202.5, 73/202, 204.27, 204.12, 204.24

See application file for complete search history.

(56) References Cited

U.S. PATENT DOCUMENTS

| 3,738,384 | A | * | 6/1973 | Hall ......................... 137/493.9 |
| 4,016,759 | A |   | 4/1977 | Baker et al. .............. 73/204.12 |
| 5,285,673 | A | * | 2/1994 | Drexel et al. ............. 73/204.27 |
| 5,359,878 | A |   | 11/1994 | Mudd ......................... 73/1.16 |
| 5,831,159 | A | * | 11/1998 | Renger ..................... 73/204.24 |
| 6,595,049 | B1 | * | 7/2003 | Maginnis et al. ........... 73/202.5 |
| 6,779,394 | B1 | * | 8/2004 | Ambrosina et al. ......... 73/202.5 |

FOREIGN PATENT DOCUMENTS

| EP | 1 139 073 | 10/2001 |
| WO | WO 92/20006 | 11/1992 |

* cited by examiner

*Primary Examiner*—Harshad Patel
(74) *Attorney, Agent, or Firm*—Young & Thompson

(57) ABSTRACT

A mass flowmeter of the thermal type provided with a flow sensor with a flow tube through which a fluid can flow during operation, with a temperature sensor in an upstream position (A) and a heater (H) in a downstream position (B), and power control means and temperature measuring means for keeping the temperature difference between A and B at a predetermined constant value. Between A and B, the flowmeter is provided with means for preventing the temperature at A from rising owing to thermal conduction from B to A via the tube in the case of no flow or a weak flow.

15 Claims, 1 Drawing Sheet

MASS FLOWMETER FOR MEASURING BY THE CT METHOD

The invention relates to a mass flowmeter of the thermal type provided with a flow sensor with a tube through which a fluid can flow during operation, with a first (upstream) position A and a second (downstream) position B, a heater H in the second (downstream) position B, and power control means and temperature measuring means for keeping the temperature difference between A and B at a predetermined constant value during operation.

Various mass flowmeters operating by the thermal principle are known. In general, a flow of a fluid such as a gas or liquid flow, or a two-phase flow, whose mass flowrate is to be measured is made to pass through a flow tube in the form a laminar or turbulent flow. When the tube is locally heated, for example by means of a resistance wire coiled around the tube, heat is transmitted through the tube wall to the gas or liquid flow by thermal conduction. The fact that the gas or liquid flow carries along (transports) heat forms the basis for various methods of measuring the mass flowrate.

A known mass flowmeter of the thermal type is described, for example, in EP-A 1139073. This known mass flowmeter comprises a flow sensor in the form of a thermally conducting flow tube provided with a resistance wire coiled around the tube and acting as a heat source or heater and also as a temperature sensor, in a first position, and a temperature sensor located further upstream. A control circuit serves to keep the temperature difference between the temperature sensors constant during flowing, and the mass flowrate of the fluid flowing through the tube is determined from data of the control circuit. This method is called the constant temperature (CT) method.

A disadvantage of such a measuring system is that an undesirable dip arises in the measuring signal when there is a comparatively weak flow in the tube. The invention has for its object to prevent the occurrence of this dip as much as possible. According to the invention, a mass flowmeter of the kind mentioned in the opening paragraph is for this purpose characterized in that it is provided with means which prevent the temperature at A from rising owing to thermal conduction from B to A via the tube in the case of no flow or a weak flow.

The invention is based on the following recognition: the temperature difference between the temperature sensor and the heater (heating element) is kept constant in the CT (constant temperature) flow measuring method. A certain power is required for this. This power is a measure for the flow. A power control is present for keeping the temperature difference constant. If there is no flow or a comparatively weak one, however, the power with which the heating element is heated is mainly removed through conduction via the tube, aside from e.g. radiation losses. The temperature at the temperature sensor (in position A) rises as a result, and a positive feedback arises in the power control, as a result of which the required power rises. It will not be until a certain flowrate has been attained that enough heat is removed by the fluid such that the temperature of the sensor is no longer influenced by the heating element. From a zero flow up to this point the required power will decrease and above this point it will increase again. This effect causes an unwanted dip in the measuring signal.

The invention provides means for preventing the temperature at the temperature sensor from rising owing to conduction through the tube in the case of no flow or a weak flow. These means may be passive or active.

If the means are passive, they may comprise, for example, a thermal short-circuiting means that makes contact with the tube in a location between the positions A and B at one end, and at the other end with a temperature equalizing body. The tube may be, for example, U-shaped and have two ends, and the temperature equalizing body may be a solid metal body ("base") with two bores through which the ends of the U-shaped tube are passed. The thermal short-circuiting means may then be formed, for example, by a copper strip interconnecting the tube and the base. In an alternative embodiment, a housing is placed on the base, and the tube is inside the housing. The housing may be provided with an internal tag that is in thermal contact with the tube for the purpose of forming a thermal short-circuiting means. Heat can thus be drained off to the base via the tag and the housing. The thermal short-circuiting means prevents the temperature at the temperature sensor from rising owing to conduction via the tube in the case of no flow or a weak flow. Since the thermal short-circuiting means, i.e. the copper strip or the tag of the housing, has a better thermal conductivity than the tube, the temperature between the sensor and the element is substantially equalized with the temperature of the base. The dip in the measuring signal is substantially reduced thereby, or even eliminated.

If active, the thermal short-circuiting means is designed such that it can be switched on and off in dependence on the flowrate value.

These and other aspects of the invention will be explained in more detail below with reference to the drawing, in which.

Figure 1:
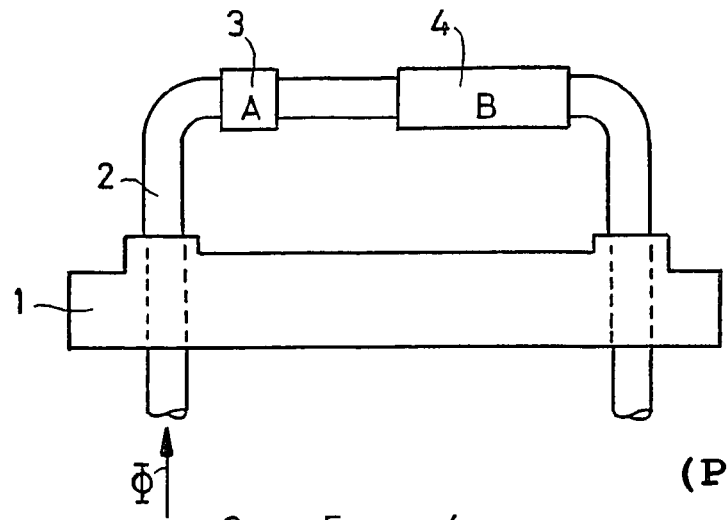
FIG. 1 shows a sensor for a conventional mass flowmeter of the thermal type.

FIG. 1 is an elevation of a conventional flow sensor with a flow tube 2. A temperature sensor in the form of a coiling 3 is present in position A. In position B there is a heating element (heater) in the form of a coiling 4 to which electric power is supplied during flow measurements. The temperature difference between the temperature sensor 3 and the heating element 4 is kept constant by means of a power control unit in the CT (constant temperature) flow measuring method. A certain power is required for this. This power is a measure for the flow. If there is no flow or a comparatively weak one, however, the power with which the heater element is heated is mainly removed through conduction via the tube 2. The temperature at the temperature sensor rises and a positive feedback arises in the power control, so that the power requirement increases. Obviously, if the temperature at the area of the temperature sensor rises and the object is to keep the temperature difference between the heater and the temperature sensor constant, then the temperature of the heater has to rise. More power is to be supplied to the heater for this purpose. But then the conduction through the tube will cause the temperature of the sensor to rise even more, etcetera. This is an iterative process that continues for some time. The supplied power accordingly has no direct relation to the flow for some time in the case of weak flows. In other words: the conventional mass flowmeter is insensitive here. It will not be until a certain flowrate has been achieved that enough heat is removed by the medium and the temperature of the temperature sensor is no longer influenced by the heating element. From zero to this point, the required power will decrease, and above that the required power will increase again. This effect causes the dip in the measuring signal mentioned above.

Figure 2:
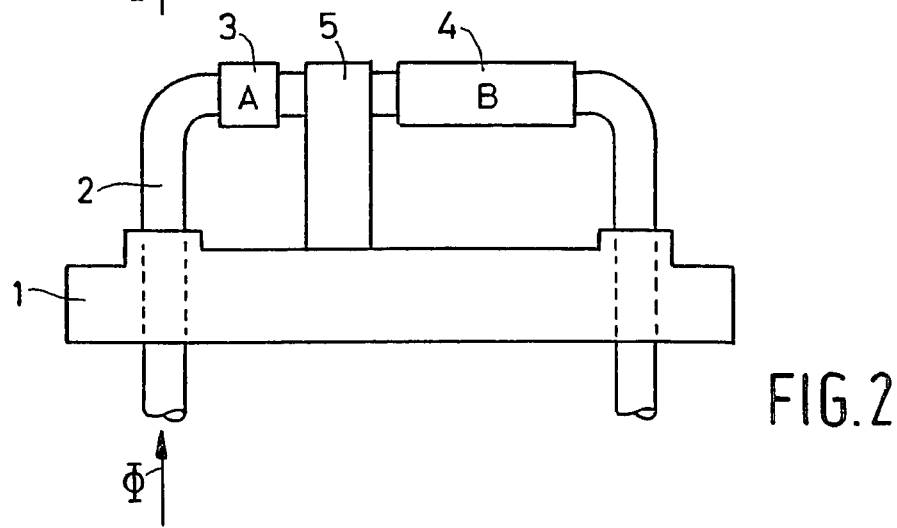
FIG. 2 shows a first embodiment of a sensor for a mass flowmeter according to the invention.

A thermal short-circuiting strip 5, for example made of copper, cf. FIG. 2, prevents the temperature at the temperature sensor from rising owing to conduction via the tube 2. Since the strip has a better thermal conductivity than the tube, the temperature between the temperature sensor and the heating element is substantially equalized with the temperature of the base 1. The dip in the measuring signal is substantially reduced thereby.

Figure 3:
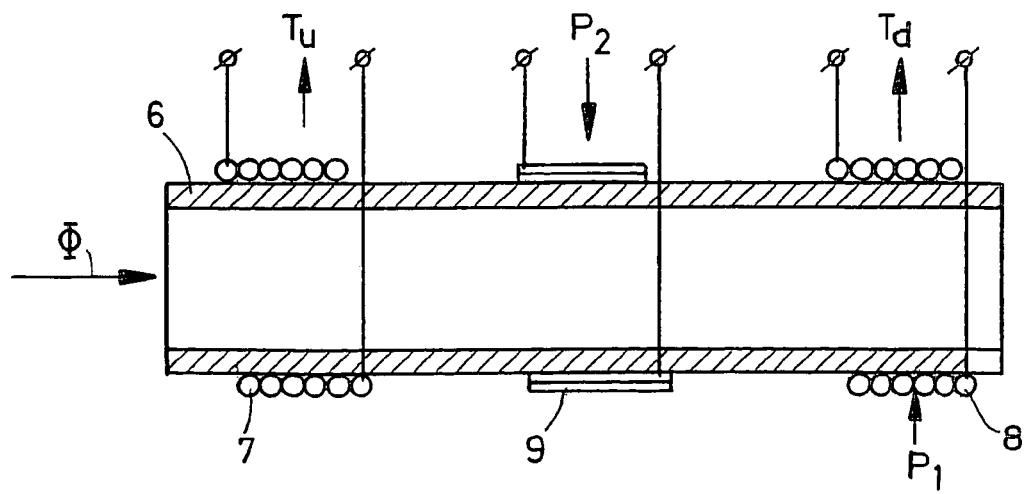
FIG. 3 shows a second embodiment of a sensor for a mass flowmeter according to the invention in longitudinal sectional view.

FIG. 3 is a longitudinal sectional view of a portion of the flow tube 6 for a flow sensor. A winding 7 of a conductive material capable of serving as a temperature sensor is provided on the tube 6 in an upstream position. It indicates the temperature Tu. A winding 8 of a temperature-sensitive resistance material is provided in a downstream position so as to act both as a heater and as a temperature sensor. Electric power P1 is supplied to the heater 8 for heating purposes. When used as a temperature sensor, the winding 8 indicates the temperature Td. A Peltier element 9 is provided on the tube between the windings 7 and 8 in this case as an active thermal short-circuiting means. Depending on the sign of the voltage to be supplied to this element, it is capable of cooling as well as heating. In the cooling mode it may thus act as an active thermal short-circuiting means. The Peltier element 9 can be controlled at weak flows such that the temperature gradient between the winding 7 and the Peltier element 9 is controlled down to zero.

Summarizing, the invention relates to a mass flowmeter of the thermal type provided with a flow sensor with a flow tube through which a fluid can flow during operation, with a temperature sensor in an upstream position (A) and a heater (H) in a downstream position (B), and power control means and temperature measuring means for keeping the temperature difference between A and B at a predetermined constant value during operation. Between A and B, the flowmeter is provided with means for preventing the temperature at A from rising owing to thermal conduction from B to A via the tube in the case of no flow or a weak flow.

The invention claimed is:

1. A mass flowmeter of the thermal type provided with a flow sensor with a U-shaped tube having two ends through which a fluid can flow during operation, with a first upstream position A and a second downstream position B, a temperature sensor in the first upstream position A and a heater H in the second downstream position B, wherein the flowmeter is provided with a metal base having two bores, the ends of the U-shaped tube passing through the two bores in the metal base, a thermal drain directly connecting the tube in a location on the tube between the positions A and B to the metal base.

2. A mass flowmeter as claimed in claim 1, wherein the thermal drain is a copper strip.

3. A mass flowmeter as claimed in claim 1, wherein the thermal drain has a better thermal conductivity than the tube.

4. A mass flowmeter as claimed in claim 1, wherein the heater H is an electrical coiling of temperature sensitive resistance wire wound on the tube and also serves as a temperature sensor.

5. A mass flowmeter as claimed in claim 1, wherein the thermal drain comprises a Peltier element provided on the tube between the positions A and B.

6. A mass flowmeter of the thermal type provided with a flow sensor with a U-shaped tube having two ends through which a fluid can flow during operation, with a first upstream position A and a second downstream position B, a temperature sensor in the first upstream position A and a heater H in the second downstream position B, wherein the flowmeter is provided with a metal base having two bores, a housing being placed on the base which encloses the U-shaped tube, the ends of the U-shaped tube passing through the two bores in the metal base, a thermal drain directly connecting the housing to a location on the tube between A and B.

7. A mass flowmeter as claimed in claim 6, wherein the thermal drain is a copper strip.

8. A mass flowmeter as claimed in claim 6, wherein thermal drain has a better thermal conductivity than the tube.

9. A mass flowmeter as claimed in claim 6, wherein the heater H is an electrical coiling of temperature sensitive resistance wire wound on the tube and also serves as a temperature sensor.

10. A mass flowmeter as claimed in claim 6, wherein the thermal drain comprises a Peltier element provided on the tube between the positions A and B.

11. A mass flowmeter of the thermal type provided with a flow sensor with a tube having two ends through which a fluid can flow during operation, with a first upstream position A and a second downstream position B, a temperature sensor in the first upstream position A and a heater H in the second downstream position B, wherein the tube is a straight tube having two ends which are thermally floating, a thermal drain being directly connected to the tube in a location between the positions A and B.

12. A mass flowmeter as claimed in claim 11, wherein the thermal drain is a copper strip.

13. A mass flowmeter as claimed in claim 11, wherein the thermal drain has a better thermal conductivity than the tube.

14. A mass flowmeter as claimed in claim 11, wherein the heater H has an electrical coiling of temperature sensitive resistance wire wound on the tube and also serves as a temperature sensor.

15. A mass flowmeter claimed in claim 11, wherein the thermal drain comprises a Peltier element provided on the tube between the positions A and B.

* * * * *